(12) United States Patent
Chen

(10) Patent No.: US 8,876,074 B2
(45) Date of Patent: Nov. 4, 2014

(54) SUPPORT ARM

(71) Applicant: Aopen Inc., New Taipei (TW)

(72) Inventor: Yi-Jen Chen, New Taipei (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 16 days.

(21) Appl. No.: 13/895,337

(22) Filed: May 15, 2013

(65) Prior Publication Data

US 2014/0197289 A1    Jul. 17, 2014

(30) Foreign Application Priority Data

Jan. 16, 2013  (TW) .............................. 102101612 A

(51) Int. Cl.
*E04G 3/00* (2006.01)
*F16M 13/02* (2006.01)

(52) U.S. Cl.
CPC ........... *F16M 13/022* (2013.01); *Y10S 248/919* (2013.01)
USPC ....................................... 248/284.1; 248/919

(58) Field of Classification Search
USPC ........ 248/274.1, 276.1, 284.1, 919, 920, 921, 248/922, 923
See application file for complete search history.

(56) References Cited

U.S. PATENT DOCUMENTS

| | | | | |
|---|---|---|---|---|
| 7,198,237 B2 * | 4/2007 | Cho et al. | ....................... | 248/133 |
| 7,494,104 B2 * | 2/2009 | Baek | ........................... | 248/372.1 |
| 7,510,155 B2 * | 3/2009 | Huang et al. | ................ | 248/278.1 |
| 7,614,594 B2 * | 11/2009 | Baek et al. | ................ | 248/274.1 |
| 7,651,058 B2 * | 1/2010 | Cho et al. | ................. | 248/123.11 |
| 7,819,368 B2 * | 10/2010 | Jung et al. | ..................... | 248/133 |
| 2005/0017135 A1 | 1/2005 | Jung | | |

FOREIGN PATENT DOCUMENTS

TW          M436744          9/2012

* cited by examiner

*Primary Examiner* — Steven Marsh
(74) *Attorney, Agent, or Firm* — Winston Hsu; Scott Margo

(57) ABSTRACT

A support arm includes a support mechanism, a wall-mounted mechanism, and an arm mechanism. The support mechanism includes a support plate having a first pivot pillar and a first pivot base having a first eccentric rod and sleeving the first pivot pillar. The wall-mounted mechanism includes a wall-mounted plate detachably disposed on a display monitor and having a second pivot pillar and a second pivot base sleeving the second pivot pillar. The arm mechanism includes a casing, an arm body disposed in the casing and having first and second pivot ends, a first spring connected to the arm body and the first eccentric rod, a first shaft passing through the first pivot base and the first pivot end, a second shaft passing through the second pivot base and the second pivot end, and a damping member sleeving the first shaft for increasing a rotating torque of the first shaft.

29 Claims, 9 Drawing Sheets

SUPPORT ARM

BACKGROUND OF THE INVENTION

1. Field of the Invention

The present invention relates to a support arm, and more specifically, to a support arm for support a display monitor on a support member.

2. Description of the Prior Art

In general, a conventional support arm for hanging a display monitor (e.g. a liquid crystal television) on a support wall usually utilizes a four bar linkage design or a sectional toggle joint design. However, the aforesaid designs may cause a problem that a lever arm of the support arm is too long to hang a display monitor with an excessive weight, so as to reduce the operation convenience of the support arm. Furthermore, it is difficult to operate the support arm since the support arm may have a complicated mechanism to provide a multi-axis angle adjusting function.

Furthermore, since the support arm does not have a shaft design of making the display monitor rotate to an appropriate support angle for table placement, the support arm could only provide a wall-mounted function so as to greatly restrain the practicality of the support arm.

SUMMARY OF THE INVENTION

An objective of the present invention is to provide a support arm for support a display monitor on a support member to solve the aforesaid problem.

The present invention provides a support arm for supporting a display monitor on a support member. The support arm includes a support mechanism, a wall-mounted mechanism, and an arm mechanism. The support mechanism includes a support plate and a first pivot base. The support plate has a first pivot pillar for being detachably disposed on the support member. The first pivot base has a first eccentric rod and sleeves the first pivot pillar to be rotatable relative to the support plate. The wall-mounted mechanism includes a wall-mounted plate and a second pivot base. The wall-mounted plate is detachably disposed on the display monitor and has a second pivot pillar. The second pivot base sleeves the second pivot pillar to be rotatable relative to the wall-mounted plate. The arm mechanism includes a casing, an arm body, a first spring, a first shaft, a second shaft, and a first damping member. The arm body is disposed in the casing and has a first pivot end and a second pivot end. The first spring is disposed in the arm body. Two ends of the first spring are connected to the arm body and the first eccentric rod respectively. The first shaft passes through the first pivot base and the first pivot end to make the arm body rotatable relative to the first pivot base. The second shaft passes through the second pivot base and the second pivot end to make the arm body rotatable relative to the second pivot base. The first damping member sleeves the first shaft for increasing a rotating torque of the first shaft relative to the first pivot base.

According to the claimed invention, the first shaft has a fixing section and at least one holding section, and the first damping member includes a coil spring and a sleeve. The coil spring sleeves the fixing section and extendedly covers the holding section. The sleeve rotatably sleeves the holding section. The coil spring is wound on the sleeve.

According to the claimed invention, the coil spring is a cylinder coil spring or a variable coil spring.

According to the claimed invention, the coil spring interferes with the fixing section for constricting the fixing section.

According to the claimed invention, the coil spring has a fastening direction along its circumference. When a torque is exerted on the coil spring to make the coil spring rotate along the fastening direction, an inner diameter of the coil spring is decreased to make the coil spring generate a counter torque along a direction opposite to the fastening direction.

According to the claimed invention, when the sleeve is rotated along the fastening direction relative to the first shaft, the sleeve drives the coil spring to rotate along fastening direction by a static friction force between the sleeve and an inner side of the coil spring so as to exert the torque on the coil spring for decreasing the inner diameter of the coil spring to constrict the sleeve.

According to the claimed invention, the second pivot base has a second eccentric rod, and the arm mechanism further includes a second spring. The second spring is disposed in the arm body. Two ends of the second spring are connected to the arm body and the second eccentric rod.

According to the claimed invention, the arm mechanism further includes a second damping member disposed between the second shaft and the second pivot base for increasing a rotating torque of the second shaft relative to the second pivot base.

According to the claimed invention, the second damping member includes a plurality of friction pads sleeving the second shaft and abutting against the second pivot base.

According to the claimed invention, the first damping member includes a plurality of friction pads sleeving the first shaft and abutting against the first pivot base.

According to the claimed invention, the support plate further has a plurality of positioning slots in a radial arrangement, and the support arm further includes a clamping mechanism. The clamping mechanism includes a U-shaped clamping base and a screw rod. The U-shaped clamping base has a first arm portion and a second arm portion. A hook structure extends from the first arm portion for clamping the first pivot pillar when the first arm portion is engaged with one of the plurality of positioning slots. The screw rod is screwed on the second arm portion and has a clamping plate portion for rotating relative to the second arm portion to make the clamping plate portion clamp the support member cooperatively with the support plate when the hook structure hooks the first pivot pillar.

According to the claimed invention, the hook structure is a C-shaped hook.

According to the claimed invention, the support mechanism further includes a buffer pad disposed under the support plate.

According to the claimed invention, the wall-mounted plate, the second pivot base, the first pivot base, the support plate, and the U-shaped clamping base have a hole respectively, and the support arm further includes a trace. The trace is electrically connected to the display monitor and passes through the holes of the wall-mounted plate and the second pivot base, the arm body, and the holes of the first pivot base and the support plate sequentially to extend through the hole of the U-shaped clamping base.

According to the claimed invention, the support plate is detachably disposed on a support wall or a support rod for hanging the display monitor on the support wall or the support rod after the support plate is detached from the support member.

The present invention further provides a support arm for supporting a display monitor on a support member. The support arm includes a support mechanism, a wall-mounted mechanism, and an arm mechanism. The support mechanism includes a support plate and a first pivot base. The support plate has a first pivot pillar for being detachably disposed on the support member. The first pivot base sleeves the first pivot pillar to be rotatable relative to the support plate. The wall-mounted mechanism includes a wall-mounted plate and a second pivot base. The wall-mounted plate is detachably disposed on the display monitor and has a second pivot pillar. The second pivot base has an eccentric rod and sleeves the second pivot pillar to be rotatable relative to the wall-mounted plate. The arm mechanism includes a casing, an arm body, a spring, a first shaft, a second shaft, a first damping member. The arm body is disposed in the casing and has a first pivot end and a second pivot end. The spring is disposed in the arm body. Two ends of the spring are connected to the arm body and the eccentric rod respectively. The first shaft passes through the first pivot base and the first pivot end to make the arm body rotatable relative to the first pivot base. The second shaft passes through the second pivot base and the second pivot end to make the arm body rotatable relative to the second pivot base. The first damping member sleeves the first shaft for increasing a rotating torque of the first shaft relative to the first pivot base.

In summary, the present invention utilizes cooperation between the shaft and the damping member to increase damping between the arm mechanism of the support arm and the support mechanism, so that the support arm could support a display monitor with a large size and have a stepless angle adjusting function. Furthermore, via the simple pivot designs of the support plate, the first pivot base, the arm body, the second pivot base, and the wall-mounted plate and the design that the spring is connected to the eccentric rod of the pivot base and the arm body, the support arm provided by the present invention not only has a multi-axis angle adjusting function to be suitable for supporting the display monitor on a support member (e.g. an office desk) or hanging the display monitor on a support wall (or a support rod), but also provides the user with a light-open-heavy-close operation feeling in adjusting the support height and the elevation angle of the display monitor. In such a manner, the present invention could greatly improve the operation convenience and the placement flexibility of the support arm.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
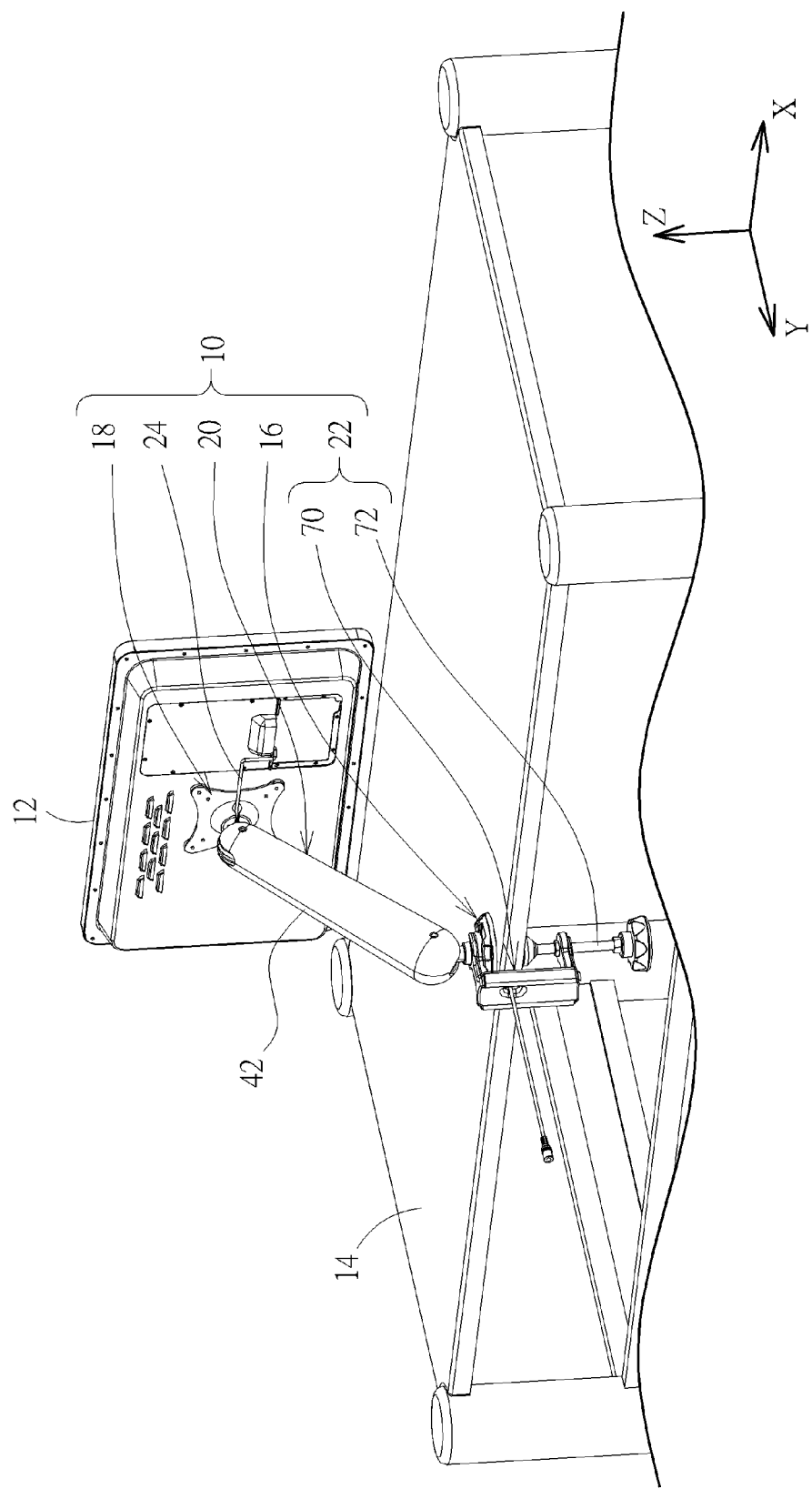
FIG. 1 is a diagram of a support arm supporting a display monitor on a support member according to an embodiment of the present invention.
Figure 2:
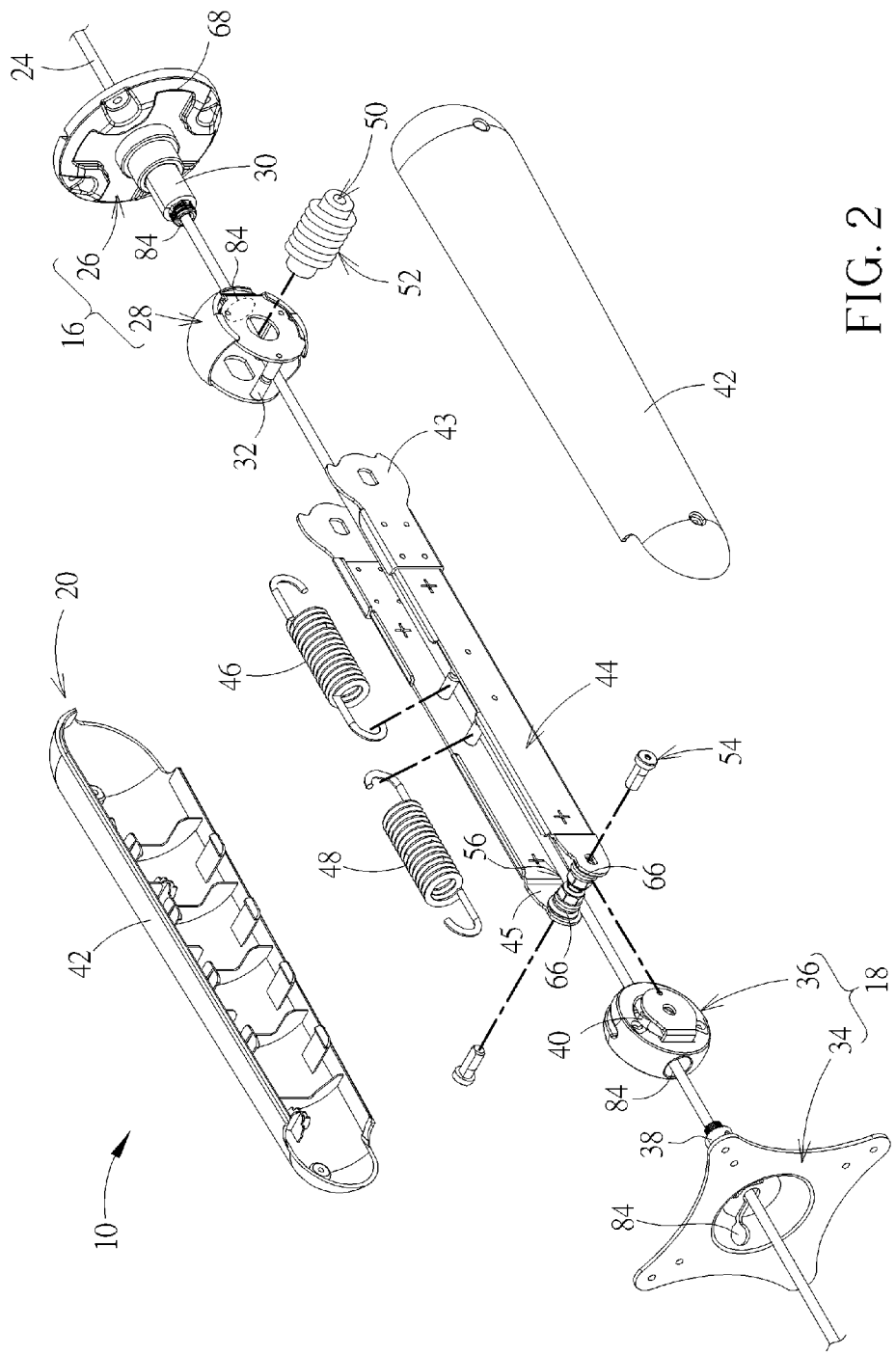
FIG. 2 is an exploded diagram of the support arm in FIG. 1.

Please refer to FIG. 1 and FIG. 2. FIG. 1 is a diagram of a support arm 10 supporting a display monitor 12 on a support member 14 according to an embodiment of the present invention. FIG. 2 is an exploded diagram of the support arm 10 in FIG. 1. The display monitor 12 could be a conventional display apparatus (e.g. a liquid crystal television), and the support member 14 could be a fixing platform for supporting the display monitor 12, such as an office desk. As shown in FIG. 1 and FIG. 2, the support arm 10 includes a support mechanism 16, a wall-mounted mechanism 18, an arm mechanism 20, a clamping mechanism 22, and a trace 24.

More detailed description for the mechanism designs of the support mechanism 16 and the wall-mounted mechanism 18 is provided as follows. As shown in FIG. 2, the support mechanism 16 includes a support plate 26 and a first pivot base 28. The support plate 26 has a first pivot pillar 30 and is detachably disposed on the support member 14. The first pivot base 28 has a first eccentric pillar 32 and sleeves the first pivot pillar 30 to be rotatable relative to the support plate 26 for a user to adjust a tilt angle of the display monitor 12 relative to the support member 14. The wall-mounted mechanism 18 includes a wall-mounted plate 34 and a second pivot base 36. The wall-mounted plate 34 is detachably disposed on the display monitor 12 and has a second pivot pillar 38. The second pivot base 36 has a second eccentric rod 40 and sleeves the second pivot pillar 38 to be rotatable relative to the wall-mounted plate 34 for a user to adjust a rotating angle of the display monitor 12 relative to the support arm 10.

As for the mechanism design of the arm mechanism 20, it could be as shown in FIG. 2. The arm mechanism 20 includes a casing 42, an arm body 44, a first spring 46, a second spring 48, a first shaft 50, a first damping member 52, a second shaft 54, and a second damping member 56. The arm body 44 is disposed in the casing 42, meaning that the casing 42 is used to covering the arm body 44 for protection and decoration. The arm body 44 has a first pivot end 43 and a second pivot end 45. The first spring 46 is disposed in the arm body 44 and two ends of the first spring 46 are connected to the arm body 44 and the first eccentric rod 32 respectively. The second spring 48 is disposed in the arm body 44 and two ends of the second spring 48 are connected to the arm body 44 and the second eccentric rod 40 respectively. In such a manner, elastic deformation of the first spring 46 could occur when the arm body 44 is rotated relative to the support plate 26, and elastic deformation of the second spring 48 could occur when the wall-mounted plate 34 is rotated relative to the arm body 44.

Figure 3:
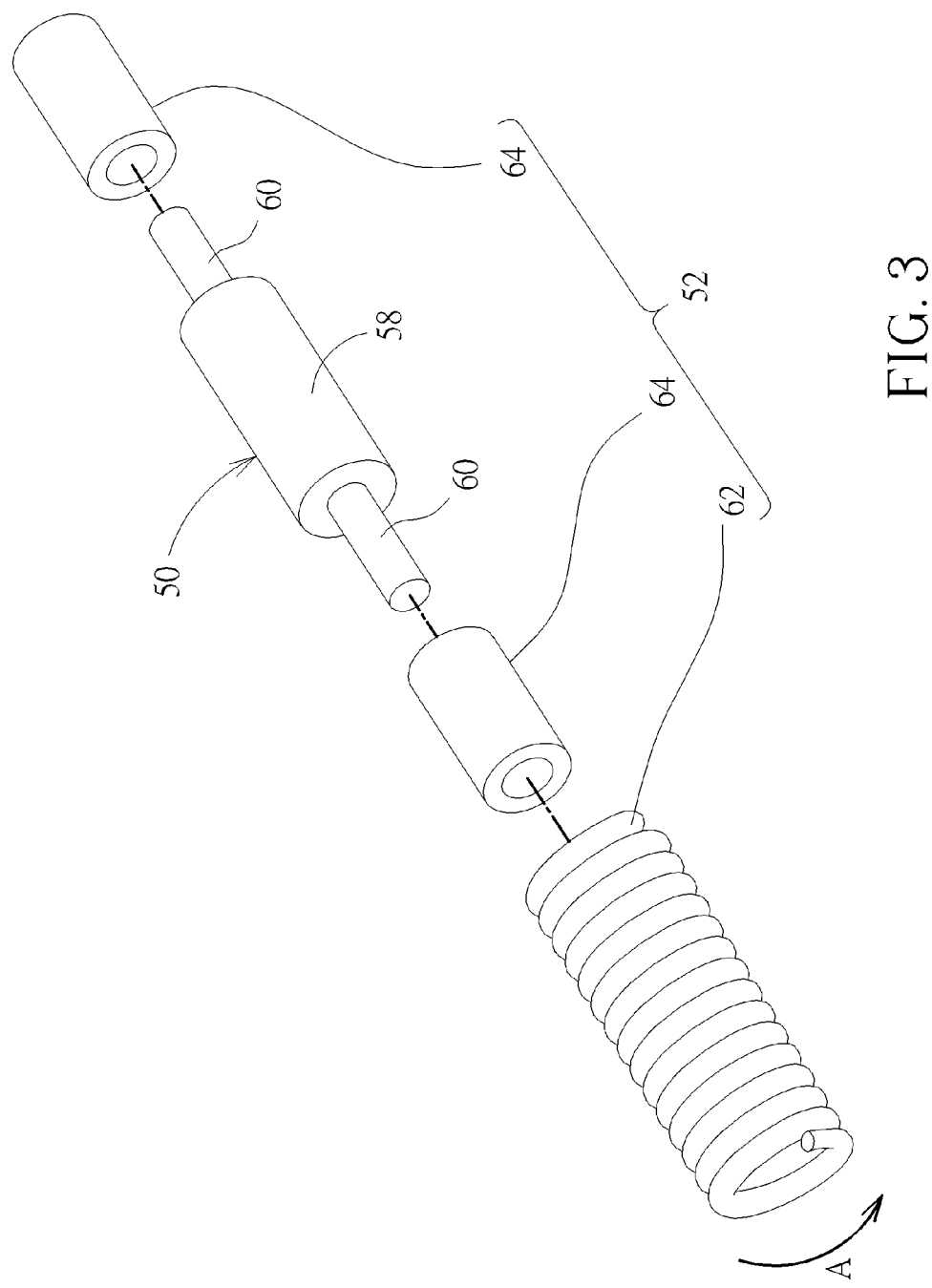
FIG. 3 is an enlarged diagram of a first shaft and a first damping member in FIG. 2.

Please refer to FIG. 2 and FIG. 3. FIG. 3 is an enlarged diagram of the first shaft 50 and the first damping member 52 in FIG. 2. As shown in FIG. 2 and FIG. 3, the first shaft 50 passes through the first pivot base 28 and the first pivot end 43 of the arm body 44 to make the arm body 44 rotatable relative to the first pivot base 28. The first damping member 52 sleeves the first shaft 50 for increasing a rotating torque of the first shaft 50 relative to the first pivot base 28. In this embodiment, the first damping member 52 utilizes assembly of a spring and a sleeve to lead to an increase of damping.

To be more specific, as shown in FIG. 3, the first shaft 50 could have a fixing section 58 and at least one holding section 60 (two as shown in FIG. 3). The first damping member 52 includes a coil spring 62 and sleeves 64 respectively corresponding to the holding sections 60. The coil spring 62 could be preferably a cylinder coil spring (or a variable coil spring)

and sleeve the fixing section 58. An outer diameter of the fixing section 58 is slightly greater than (or substantially equal to) an inner diameter of the coil spring 62 to make the coil spring 62 fixed to the fixing section 58 tightly and cover the holding section 60. In practical application, the coil spring 62 could have a fastening direction A along its circumference. That is, when a torque is exerted on the coil spring 62 to make the coil spring 62 rotate along the fastening direction A, the inner diameter of the coil spring 62 could be reduced so as to generate a counter torque in a direction opposite to the fastening direction A. On the contrary, when the coil spring 62 is rotated in the direction opposite to the fastening direction A, the inner diameter of the coil spring 62 could be increased. The sleeve 64 could be preferably a hollow cylinder with two openings. An inner diameter of the sleeve 64 is not less than an outer diameter of the holding section 60, and an outer diameter of the sleeve 64 is substantially equal to the inner diameter of the coil spring 62 and slightly less than the outer diameter of the fixing section 58 (but not limited thereto). Via the aforesaid designs, the sleeve 64 could rotatably sleeve the holding section 60 and located between an inner side of the coil spring 62 and the holding section 60. In such a manner, the coil spring 62 could extend from the fixing section 58 to be wound on the sleeve 64, so that an outer surface of the sleeve 64 could contact with the inner side of the coil spring 62.

Accordingly, when the support arm 10 supports the display monitor 12 on the support member 14, the display monitor 12 could correspondingly generate a rotating torque to rotate the sleeve 64 along the fastening direction A of the coil spring 62 relative to the first shaft 50. At this time, the sleeve 64 could utilize a static friction force between itself and the coil spring 62 to rotate the coil spring 62 along the fastening direction A, and could exert a torque on the coil spring 62. Thus, the inner diameter of the coil spring 62 could be reduced to make the coil spring 62 constrict the sleeve 64 tightly, so as to prevent the sleeve 64 from rotating along the fastening direction A relative to the first shaft 50. In such a manner, stepless angle adjustment of the display monitor 12 could be achieved accordingly. To be noted, when a user lifts the display monitor 12, the sleeve 64 could rotate the coil spring 62 in the direction opposite to the fastening direction A to increase the inner diameter of the coil spring 62 for reducing a friction force between the coil spring 62 and the sleeve 64, so that the display monitor 12 could be lifted more easily. In summary, in this embodiment, the support arm 10 utilizes the aforesaid design that the inner side of the coil spring constricts the sleeve tightly to lead to an increase of damping, so as to increase s rotating torque of the arm mechanism 20 relative to the support mechanism 16. Accordingly, the loading capacity of the support arm 10 could be greatly improved.

On the other hand, as shown in FIG. 2 and FIG. 3, the second shaft 54 passes through the second pivot base 36 and the second pivot end 45 of the arm body 44 to make the second pivot base 36 rotatable relative to the arm body 44. The second damping member 56 is disposed between the second shaft 54 and the second pivot base 36 for increasing a rotating torque of the second shaft 54 relative to the second pivot base 36. In this embodiment, the second damping member 56 could include a plurality of friction pads 66. The plurality of friction pads 66 sleeves the second shaft 54 and abuts against the second pivot base 36 tightly to lead to an increase of damping between the second shaft 54 and the second pivot base 36.

Figure 4:
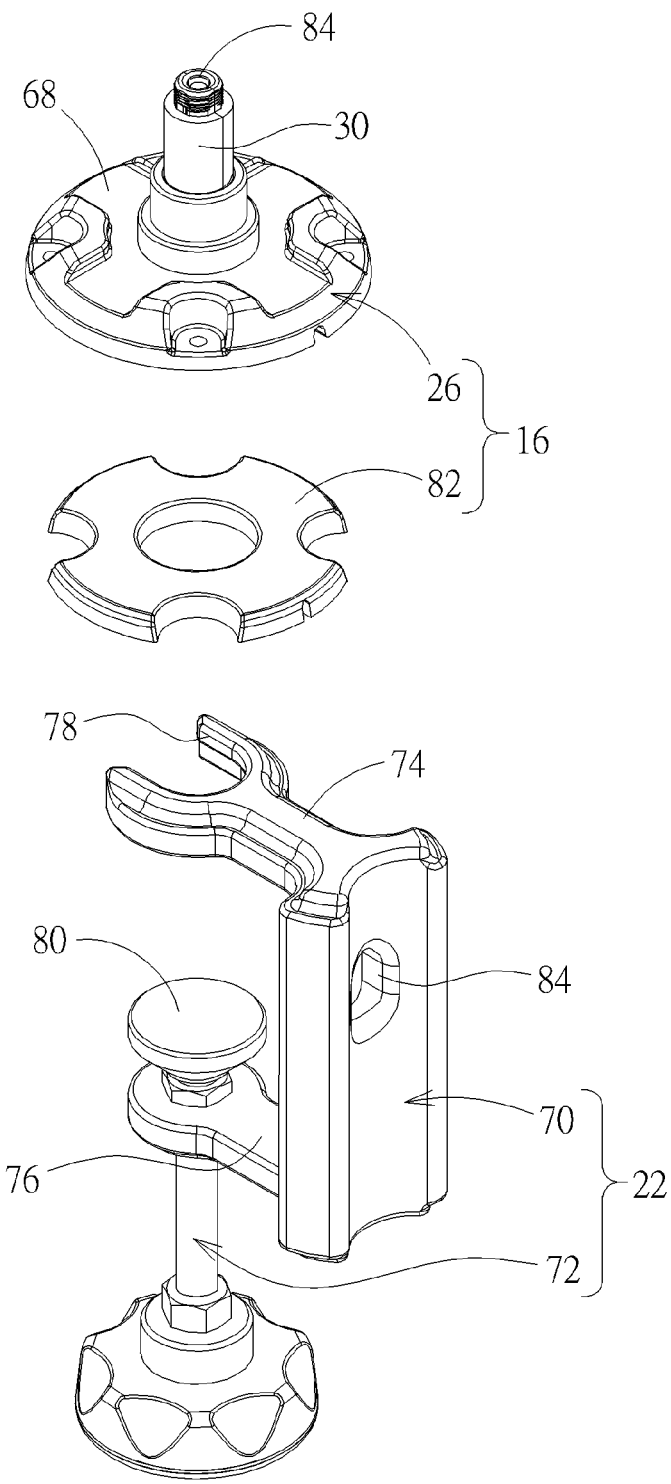
FIG. 4 is an enlarged diagram of a clamping mechanism in FIG. 1, a support plate, and a buffer pad.

Please refer to FIG. 4, which is an enlarged diagram of the clamping mechanism 22 in FIG. 1 with a support plate 26 and a buffer pad 82. As shown in FIG. 4, the support plate 26 could further have a plurality of positioning slots 68 in a radial arrangement, and the clamping mechanism 22 could include a U-shaped clamping base 70 and a screw rod 72. The U-shaped clamping base 70 has a first arm portion 74 and a second arm portion 76. A hook structure 78 extends from the first arm portion 74. The hook structure 78 could be a C-shaped hook (but not limited thereto) for hooking the first pivot pillar 30 when the first arm portion 74 is engaged with one of the positioning slots 68. The screw rod 72 is screwed on the second arm portion 76 and has a clamping plate portion 80. The screw rod 72 is used for rotating relative to the second arm portion 76 when the hook structure 78 hooks the first pivot pillar 30, so that the support member 14 could be clamped by the clamping plate portion 80 and the support plate 26. Accordingly, the support mechanism 16 could be fixed to the support member 14 steadily via the clamping mechanism 22 (as shown in FIG. 1). Furthermore, as shown in FIG. 4, the support mechanism 16 could further include the buffer pad 82. The buffer pad 82 is disposed under the support plate 26 for preventing the support member 14 from being scratched by the support plate 26.

Figure 5:
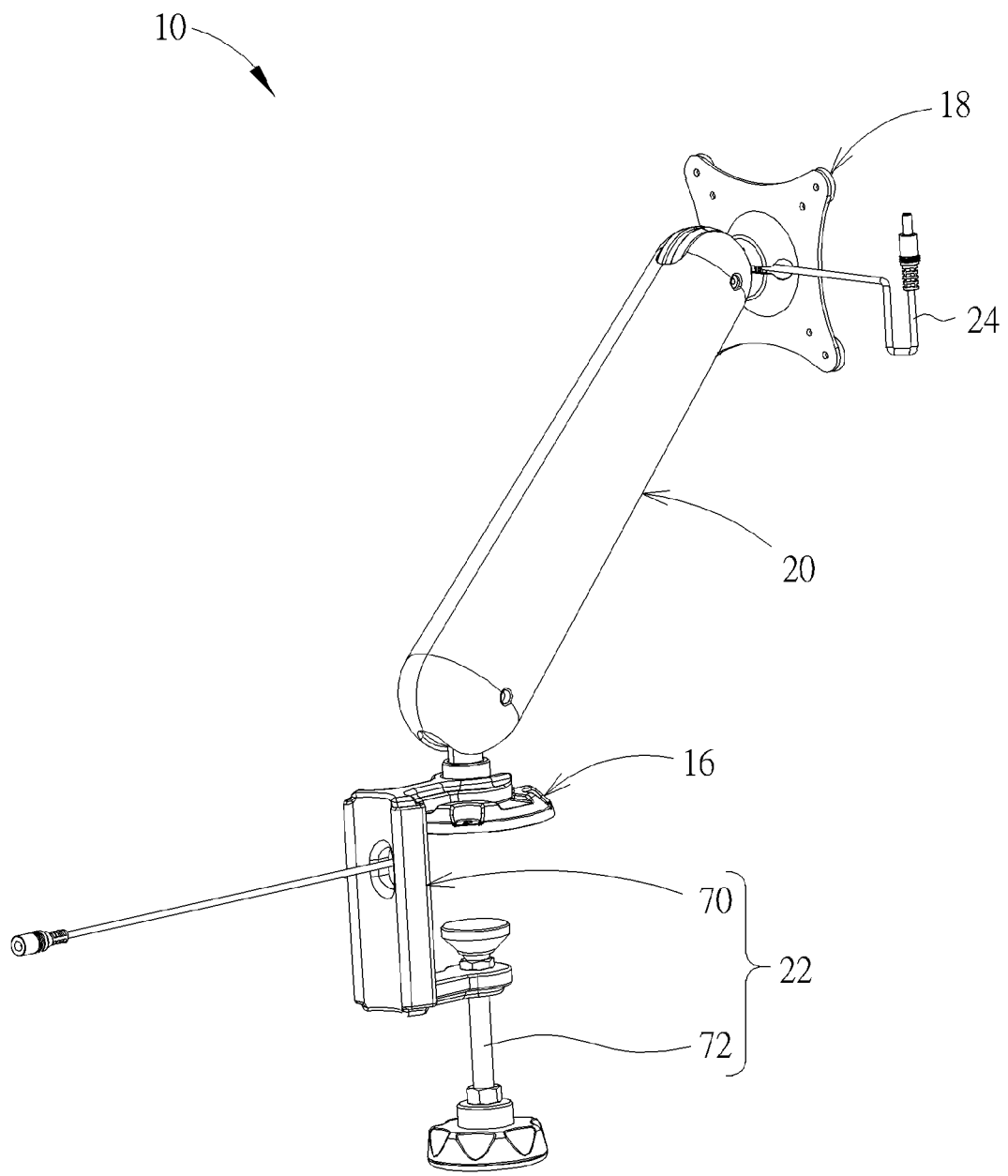
FIG. 5 is an enlarged diagram of the support arm in FIG. 1.

Furthermore, as shown in FIG. 1, FIG. 2, and FIG. 4, the wall-mounted plate 34, the second pivot base 36, the first pivot base 28, the support plate 26, and the U-shaped support base 70 could have a hole 84 respectively, and the trace 24 is electrically connected to the display monitor 12. In this embodiment, the trace 24 could pass through the holes 84 of the wall-mounted plate 34 and the second pivot base 36, the arm body 44, and the holes 84 of the first pivot base 28 and the support plate 26 sequentially and then extend through the hole 84 of the U-shaped clamping base 70 to be coupled to an external power source or a video signal source. Accordingly, the trace 24 could be concealed in the support arm 10 to make the support arm 10 have a compact look (as shown in FIG. 5).

Figure 6:
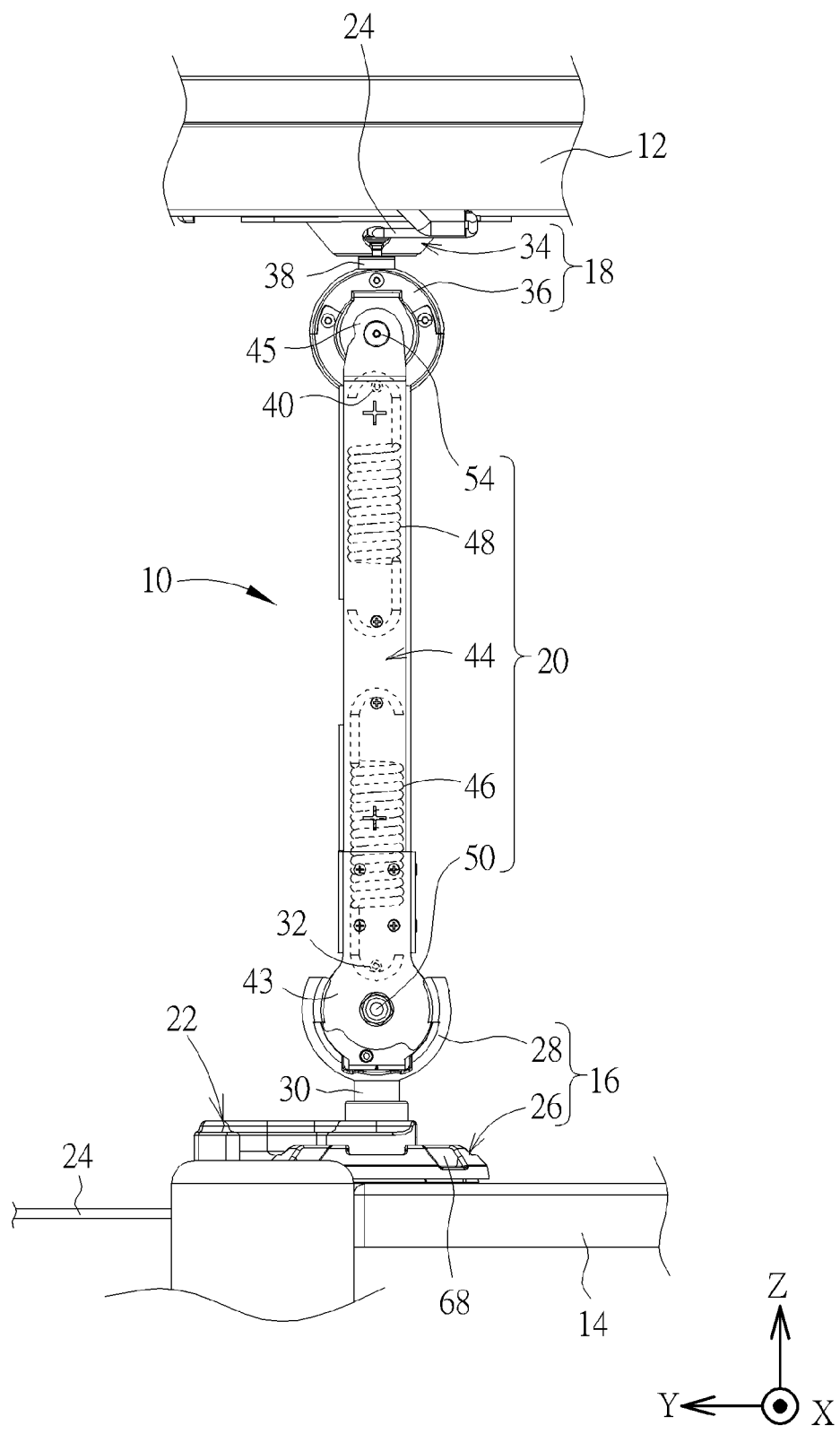
FIG. 6 is a side view of the support arm in FIG. 2 being assembled with the display monitor and the support member after being assembled.
Figure 7:
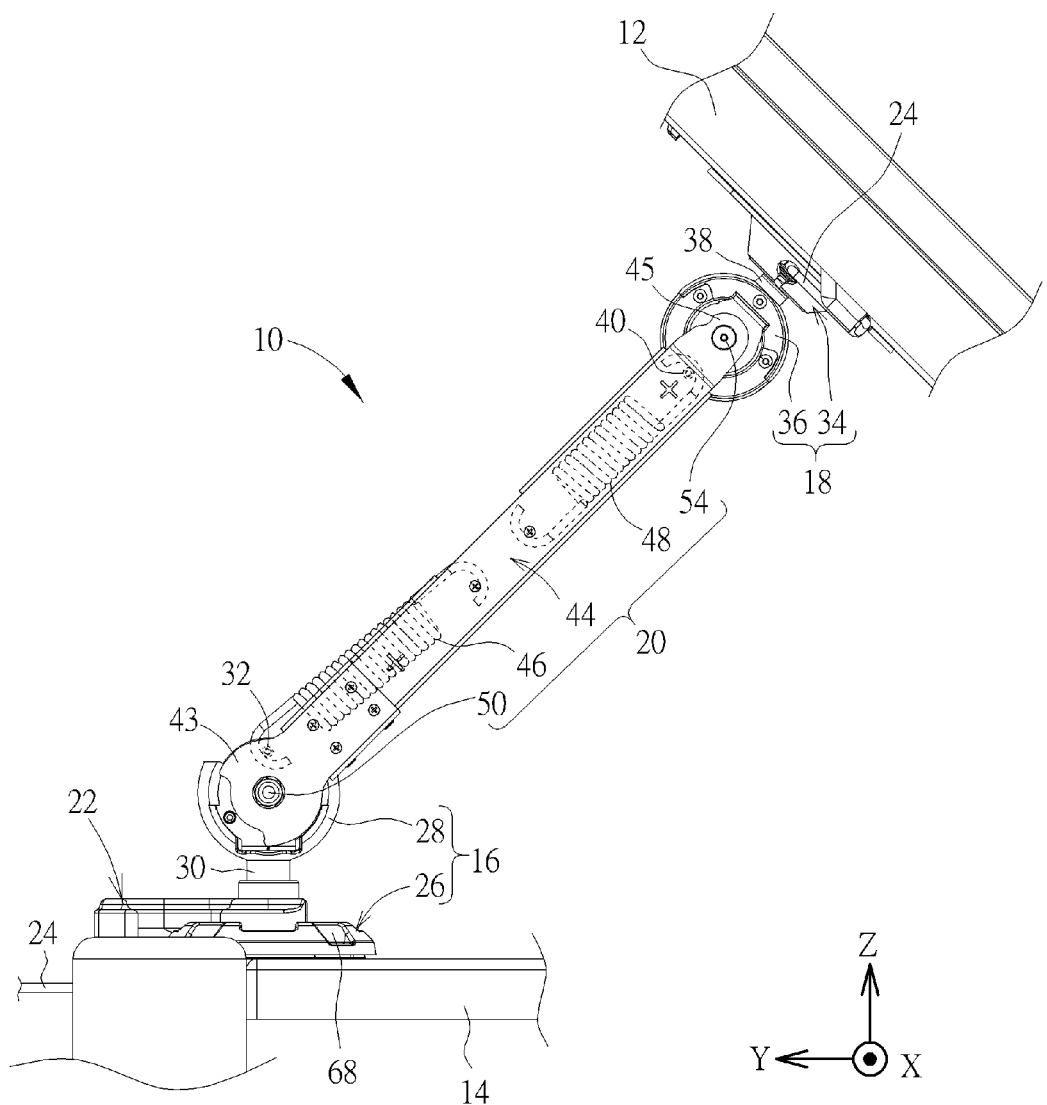
FIG. 7 is a side view of an arm body in FIG. 6 being rotated clockwise relative to a first pivot base.
Figure 8:
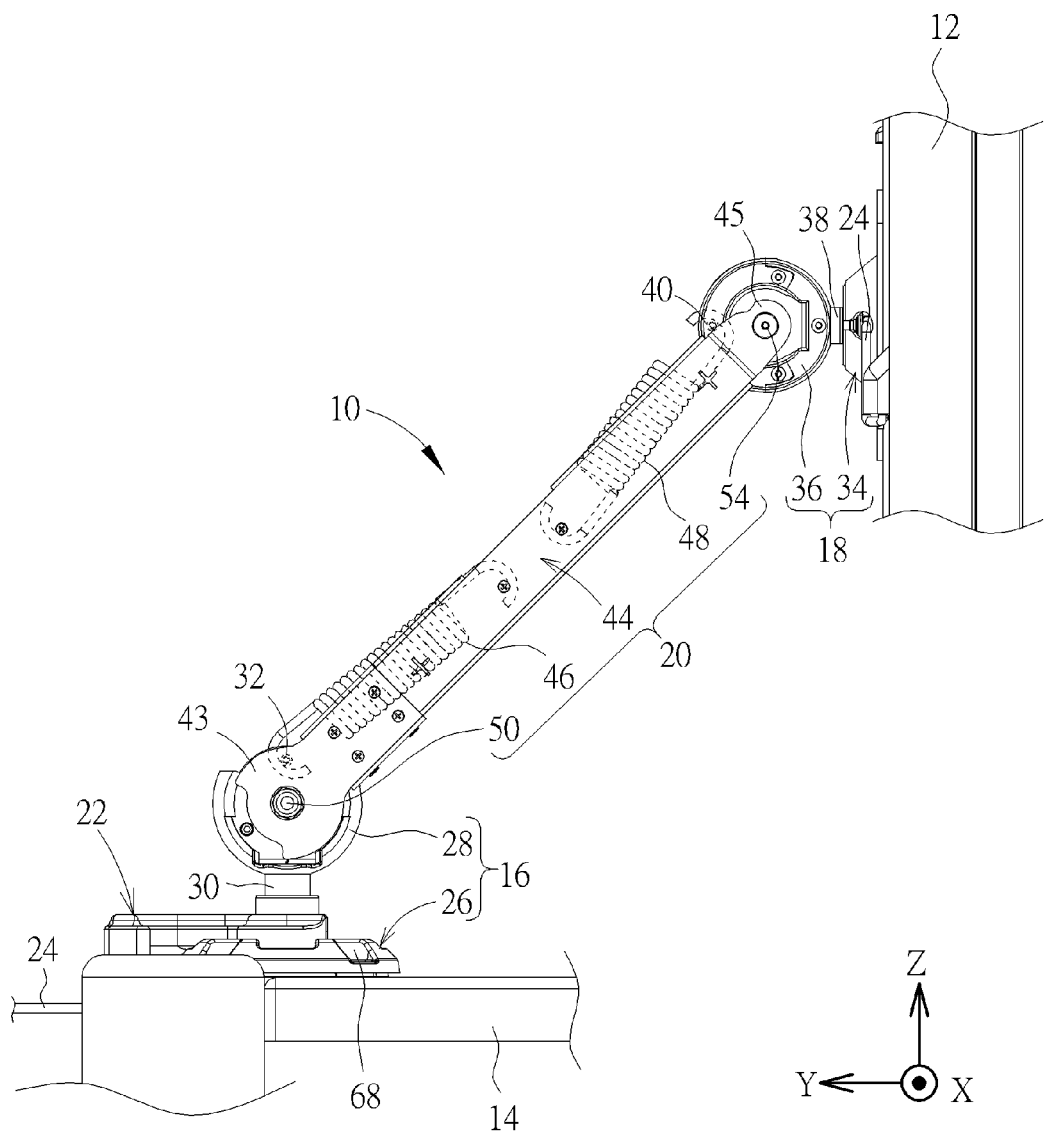
FIG. 8 is a side view of a second pivot base in FIG. 7 being rotated clockwise relative to the arm body.

More detailed description for the operation of the support arm 10 is provided as follows. Please refer to FIG. 1, FIG. 4, FIG. 6, FIG. 7, and FIG. 8. FIG. 6 is a side view of the support arm 10 in FIG. 2 being assembled with the display monitor 12 and the support member 14 after being assembled. FIG. 7 is a side view of the arm body 44 in FIG. 6 being rotated clockwise relative to the first pivot base 28. FIG. 8 is a side view of the second pivot base 36 in FIG. 7 being rotated clockwise relative to the arm body 44. For clearly showing the inner mechanism of the support arm 10, the casing 42 is omitted in FIG. 6, FIG. 7, and FIG. 8. When a user wants to utilize the support arm 10 to support the display monitor 12 on the support member 14 for viewing images displayed by the display monitor 12 conveniently, the user just needs to screw the wall-mounted plate 34 of the wall-mounted mechanism 18 on a back surface of the display monitor 12, and then utilizes the hook structure 78 of the first arm portion 74 to hook the first pivot pillar 30 of the support plate 26 via cooperation between the first arm portion 74 of the U-shaped clamping base 70 and one of the positioning slots 68 of the support plate 26. Subsequently, the user could rotate the screw rod 72 to drive the clamping plate portion 80 to move upward relative to the second arm portion 76 until the support member 14 is clamped tightly by the clamping plate portion 80 and the support plate 26. Accordingly, the display monitor 12 could be disposed on the support member 14 steadily via support of the support arm 10 (as shown in FIG. 1).

The wiggle angle adjusting operation of the display monitor 12 is described as follows. As known from the above description, the first pivot base 28 could take a Z-axis in FIG. 6 as a rotating axis to rotate relative to the support plate 26 by sleeving the first pivot pillar 30. Accordingly, when the user utilizes the support arm 10 to support the display monitor 12 on the support member 14, the user could push the display monitor 12 leftward or rightward, so that the first pivot base 28 could take the Z-axis in FIG. 6 as the rotating axis to rotate relative to the support plate 26. Thus, the user could adjust a wiggle angle of the display monitor 12 relative to the support member 14. In this embodiment, via the design that the first pivot base 28 is rotatable relative to the support plate 26, the display monitor 12 could preferably have a wiggle angle adjustment range of 360° relative to the support member 14 via the support arm 10.

The support height adjusting operation of the display monitor 12 is described as follows. As known from the above description, the arm body 44 could take an X-axis in FIG. 6 as a rotating axis to rotate relative to the first pivot base 28 by utilizing the first shaft 50 to pass through the first pivot end 43 and the first pivot base 28. Accordingly, when the user utilizes the support arm 10 to support the display monitor 12 on the support member 14, the user could press or lift the display monitor 12, so that the arm body 44 could take the X-axis in FIG. 6 as the rotating axis to rotate relative to the first pivot base 28. Thus, the user could adjust a support height of the display monitor 12 relative to the support member 14. For example, the user could press the display monitor 12 to rotate the arm body 44 clockwise relative to the first pivot base 28 from a position as shown in FIG. 6 to a position as shown in FIG. 7 for reducing the support height of the display monitor 12 relative to the support member 14. In this embodiment, via the design that the arm body 44 is rotatable relative to the first pivot base 28, the display monitor 12 could preferably have a support height adjustment range of 90° relative to the support member 14 via the support arm 10.

To be noted, as shown in FIG. 6 and FIG. 7, since the first spring 46 is connected to the first eccentric rod 32 of the first pivot base 28 and the arm body 44 respectively, the first spring 46 could be in a stretched state with rotation of the arm body 44 to correspondingly generate a counterclockwise resisting force during the user presses the display monitor 12 to rotate the arm body 44 clockwise relative to the first pivot base 28 from a position as shown in FIG. 6 to a position as shown in FIG. 7, so as to provide the user with a heavy operation feeling. On the contrary, during the user lifts the display monitor 12 to rotate the arm body 44 counterclockwise relative to the first pivot base 28 from the position as shown in FIG. 7 to the position as shown in FIG. 6, the first spring 46 in the stretched state could provide elastic force to help the user lift the display monitor 12 with less effort. In summary, via the design that the first spring 46 is connected to the first eccentric rod 32 of the first pivot base 28 and the arm body 44, the support arm 10 could provide the user with a light-open-heavy-close operation feeling in adjusting the support height of the display monitor 12.

The elevation angle adjusting operation of the display monitor 12 is described as follows. As known from the above description, the second pivot base 36 could take an X-axis in FIG. 7 as a rotating axis to rotate relative to the arm body 44 by utilizing the second shaft 54 to pass through the second pivot end 45 and the second pivot base 36. Accordingly, when the user utilizes the support arm 10 to support the display monitor 12 on the support member 14, the user could push or pull the display monitor 12 to make the second pivot base 36 take the X-axis in FIG. 7 as the rotating axis to rotate relative to the arm body 44, so that the user could adjust an elevation angle of the display monitor 12 relative to the support member 14. For example, the user could pull the display monitor 12 to rotate the second pivot base 36 clockwise relative to the arm body 44 from a position as shown in FIG. 7 to a position as shown in FIG. 8, so as to make the To be noted, as shown in FIG. 6 and FIG. 7, since the first spring 46 is connected to the first eccentric rod 32 of the first pivot base 28 and the arm body 44 respectively, the first spring 46 could be in a stretched state with rotation of the arm body 44 to correspondingly generate a counterclockwise resisting force during the user presses the display monitor 12 to rotate the arm body 44 clockwise relative to the first pivot base 28 from a position as shown in FIG. 6 to a position as shown in FIG. 7, so as to provide the user with a heavy operation feeling. On the contrary, during the user lifts the display monitor 12 to rotate the arm body 44 counterclockwise relative to the first pivot base 28 from the position as shown in FIG. 7 to the position as shown in FIG. 6, the first spring 46 in the stretched state could provide elastic force to help the user lift the display monitor 12 with less effort. In summary, via the design that the first spring 46 is connected to the first eccentric rod 32 of the first pivot base 28 and the arm body 44, the support arm 10 could provide the user with a light-open-heavy-close operation feeling in adjusting the support height of the display monitor 12 embodiment, via the design that the second pivot base 36 is rotatable relative to the arm body 44, the display monitor 12 could preferably have an elevation angle adjustment range of 180° relative to the support member via the support arm 10.

To be noted, as shown in FIG. 7 and FIG. 8, since the second spring 48 is connected to the second eccentric rod 40 of the second pivot base 36 and the arm body 44 respectively, the second spring 48 could be in a stretched state with rotation of the second pivot base 36 to correspondingly generate a counterclockwise resisting force during the user pulls the display monitor 12 to rotate the second pivot base 36 clockwise relative to the arm body 44 from the position as shown in FIG. 7 to the position as shown in FIG. 8, so as to provide the user with a heavy operation feeling. On the contrary, during the user pushes the display monitor 12 to rotate the second pivot base 36 counterclockwise relative to the arm body 44 from the position as shown in FIG. 8 to the position as shown in FIG. 7, the second spring 48 in the stretched state could provide elastic force to help the user push the display monitor 12 with less effort. In summary, via the design that the second spring 48 is connected to the second eccentric rod 40 of the second pivot base 36 and the arm body 44, the support arm 10 could provide the user with a light-open-heavy-close operation feeling in adjusting the elevation angle of the display monitor 12.

The rotating angle adjusting operation of the display monitor 12 is described as follows. As known from the above description, the wall-mounted plate 26 could take the second pivot pillar 38 as a rotating axis to rotate relative to the second pivot base 36 by utilizing the second pivot base 36 to sleeve the second pivot pillar 38. Accordingly, when the user utilizes the support arm 10 to support the display monitor 12 on the support member 14, the user could rotate the display monitor 12 to make the wall-mounted plate 26 take the second pivot pillar 38 as the rotating axis to rotate relative to the second pivot base 36, so that the user could adjust a rotating angle of the display monitor 12 relative to the support member 14. In this embodiment, via the design that the wall-mounted plate 26 is rotatable relative to the second pivot base 36, the display monitor 12 could preferably have a rotating angle adjustment range of 90° relative to the support member 14 via the support arm 10, so as to be placed upright or transversely relative to the support member 14.

Figure 9:
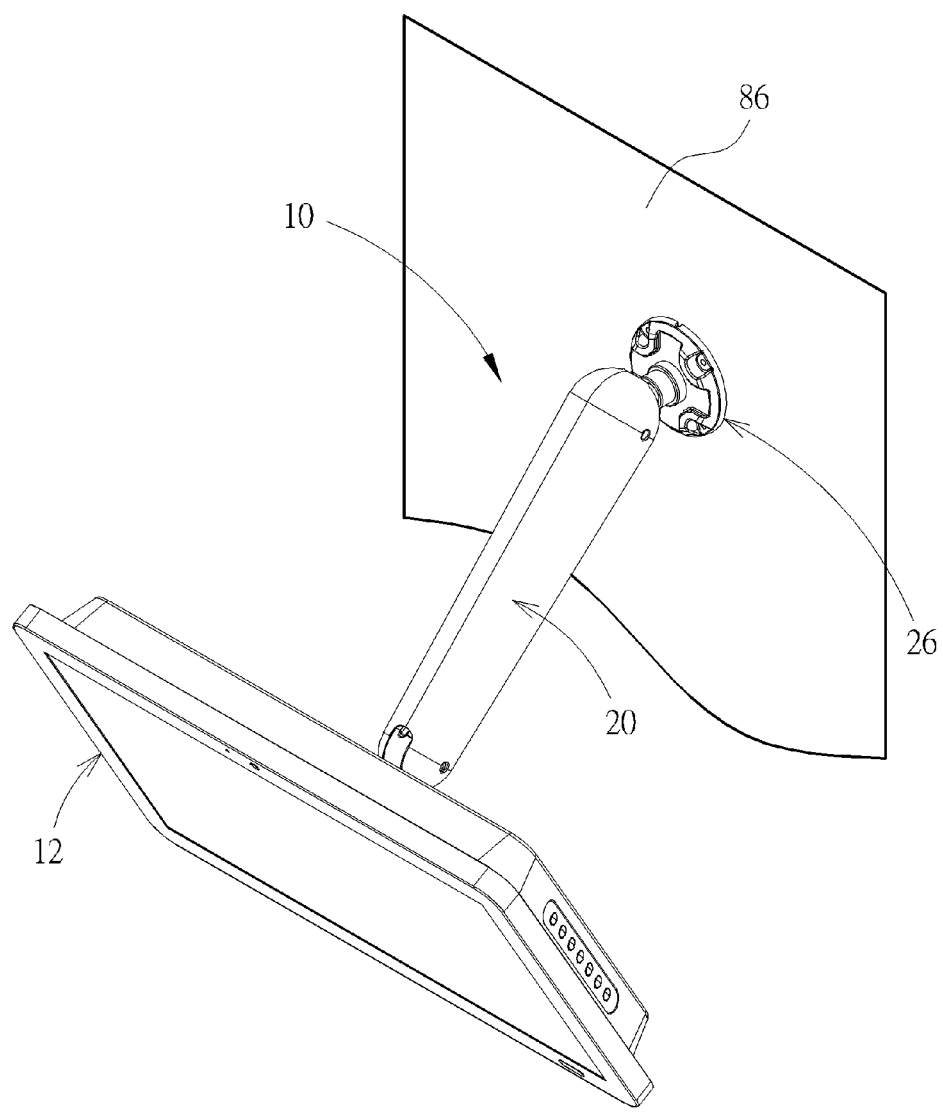
FIG. 9 is a diagram of the support arm in FIG. 1 hanging the display monitor on a support wall.

It should be mentioned that the first spring 46 and the second spring 48 could be alternatively omitted for simplifying the mechanism design of the support arm 10. Furthermore, the damping designs of the first damping member 52 and the second damping member 56 could be applied to each other for improving the design flexibility of the support arm 10. For example, in another embodiment, the first spring 52 could include a plurality of friction pads 66 sleeving the first shaft 50 and abutting against the first pivot base 28 tightly to increase damping between first shaft 50 and the first pivot base 28, or the second damping member 56 could utilize assembly of the coil spring 62 and the sleeve 64 to increase damping between the second shaft 54 and the second pivot base 36. As for which design is utilized, it depends on the practical application of the support arm 10. Furthermore, after the support arm 10 assembled with the display monitor 12 is detached from the support member 14 and separate from the clamping mechanism 22, the user could hang the display monitor 12 on a support wall or a support rod by fixing the support plate 26 to the support wall or the support rod (e.g. by a screwing locking method) after adjusting the elevation angle of the display monitor 12 appropriately (as shown in FIG. 9). As for the related description for the wall-mounted operation of the display monitor 12, it could be reasoned according to the aforesaid embodiments and therefore omitted herein.

Compared with the prior art utilizing a four bar linkage design or a sectional toggle joint design, the present invention utilizes cooperation between the shaft and the damping member to increase damping between the arm mechanism of the support arm and the support mechanism, so that the support arm could support a display monitor with a large size and have a stepless angle adjusting function. Furthermore, via the simple pivot designs of the support plate, the first pivot base, the arm body, the second pivot base, and the wall-mounted plate and the design that the spring is connected to the eccentric rod of the pivot base and the arm body, the support arm provided by the present invention not only has a multi-axis angle adjusting function to be suitable for supporting the display monitor on a support member (e.g. an office desk) or hanging the display monitor on a support wall (or a support rod), but also provides the user with a light-open-heavy-close operation feeling in adjusting the support height and the elevation angle of the display monitor. In such a manner, the present invention could greatly improve the operation convenience and the placement flexibility of the support arm.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A support arm for supporting a display monitor on a support member, the support arm comprising:
   a support mechanism comprising:
      a support plate having a first pivot pillar for being detachably disposed on the support member; and
      a first pivot base having a first eccentric rod and sleeving the first pivot pillar to be rotatable relative to the support plate;
   a wall-mounted mechanism comprising:
      a wall-mounted plate detachably disposed on the display monitor and having a second pivot pillar; and
      a second pivot base sleeving the second pivot pillar to be rotatable relative to the wall-mounted plate; and
   an arm mechanism comprising:
      a casing;
      an arm body disposed in the casing and having a first pivot end and a second pivot end;
      a first spring disposed in the arm body, two ends of the first spring being connected to the arm body and the first eccentric rod respectively;
      a first shaft passing through the first pivot base and the first pivot end to make the arm body rotatable relative to the first pivot base;
      a second shaft passing through the second pivot base and the second pivot end to make the arm body rotatable relative to the second pivot base; and
      a first damping member sleeving the first shaft for increasing a rotating torque of the first shaft relative to the first pivot base.

2. The support arm of claim 1, wherein the first shaft has a fixing section and at least one holding section, and the first damping member comprises:
   a coil spring sleeving the fixing section and extendedly covering the holding section; and
   a sleeve rotatably sleeving the holding section, the coil spring being wound on the sleeve.

3. The support arm of claim 2, wherein the coil spring is a cylinder coil spring or a variable coil spring.

4. The support arm of claim 2, wherein the coil spring interferes with the fixing section for constricting the fixing section.

5. The support arm of claim 2, wherein the coil spring has a fastening direction along its circumference, and when a torque is exerted on the coil spring to make the coil spring rotate along the fastening direction, an inner diameter of the coil spring is decreased to make the coil spring generate a counter torque along a direction opposite to the fastening direction.

6. The support arm of claim 5, wherein when the sleeve is rotated along the fastening direction relative to the first shaft, the sleeve drives the coil spring to rotate along the fastening direction by a static friction force between the sleeve and an inner side of the coil spring so as to exert the torque on the coil spring for decreasing the inner diameter of the coil spring to constrict the sleeve.

7. The support arm of claim 1, wherein the second pivot base has a second eccentric rod, and the arm mechanism further comprises:
   a second spring disposed in the arm body, two ends of the second spring being connected to the arm body and the second eccentric rod.

8. The support arm of claim 7, wherein the arm mechanism further comprises:
   a second damping member disposed between the second shaft and the second pivot base for increasing a rotating torque of the second shaft relative to the second pivot base.

9. The support arm of claim 8, wherein the second damping member comprises a plurality of friction pads sleeving the second shaft and abutting against the second pivot base.

10. The support arm of claim 1, wherein the first damping member comprises a plurality of friction pads sleeving the first shaft and abutting against the first pivot base.

11. The support arm of claim 1, wherein the support plate further has a plurality of positioning slots in a radial arrangement, and the support arm further comprises:
   a clamping mechanism comprising:
      a U-shaped clamping base having a first arm portion and a second arm portion, a hook structure extending from the first arm portion for clamping the first pivot pillar when the first arm portion is engaged with one of the plurality of positioning slots; and
      a screw rod screwed on the second arm portion and having a clamping plate portion for rotating relative to the second arm portion to make the clamping plate portion clamp the support member cooperatively with the support plate when the hook structure hooks the first pivot pillar.

12. The support arm of claim 11, wherein the hook structure is a C-shaped hook.

13. The support arm of claim 11, wherein the support mechanism further comprises a buffer pad disposed under the support plate.

14. The support arm of claim 11, wherein the wall-mounted plate, the second pivot base, the first pivot base, the support plate, and the U-shaped clamping base have a hole respectively, and the support arm further comprises:
 a trace electrically connected to the display monitor and passing through the holes of the wall-mounted plate and the second pivot base, the arm body, and the holes of the first pivot base and the support plate sequentially to extend through the hole of the U-shaped clamping base.

15. The support arm of claim 1, wherein the support plate is detachably disposed on a support wall or a support rod for hanging the display monitor on the support wall or the support rod after the support plate is detached from the support member.

16. A support arm for supporting a display monitor on a support member, the support arm comprising:
 a support mechanism comprising:
  a support plate having a first pivot pillar for being detachably disposed on the support member; and
  a first pivot base sleeving the first pivot pillar to be rotatable relative to the support plate;
 a wall-mounted mechanism comprising:
  a wall-mounted plate detachably disposed on the display monitor and having a second pivot pillar; and
  a second pivot base having an eccentric rod and sleeving the second pivot pillar to be rotatable relative to the wall-mounted plate; and
 an arm mechanism comprising:
  a casing;
  an arm body disposed in the casing and having a first pivot end and a second pivot end;
  a spring disposed in the arm body, two ends of the spring being connected to the arm body and the eccentric rod respectively;
  a first shaft passing through the first pivot base and the first pivot end to make the arm body rotatable relative to the first pivot base;
  a second shaft passing through the second pivot base and the second pivot end to make the arm body rotatable relative to the second pivot base; and
  a first damping member sleeving the first shaft for increasing a rotating torque of the first shaft relative to the first pivot base.

17. The support arm of claim 16, wherein the first shaft has a fixing section and at least one holding section, and the first damping member comprises:
 a coil spring sleeving the fixing section and extendedly covering the holding section; and
 a sleeve rotatably sleeving the holding section, the coil spring being wound on the sleeve.

18. The support arm of claim 17, wherein the coil spring is a cylinder coil spring or a variable coil spring.

19. The support arm of claim 17, wherein the coil spring interferes with the fixing section for constricting the fixing section.

20. The support arm of claim 17, wherein the coil spring has a fastening direction along its circumference, and when a torque is exerted on the coil spring to make the coil spring rotate along the fastening direction, an inner diameter of the coil spring is decreased to make the coil spring generate a counter torque along a direction opposite to the fastening direction.

21. The support arm of claim 20, wherein when the sleeve is rotated along the fastening direction relative to the first shaft, the sleeve drives the coil spring to rotate along the fastening direction by a static friction force between the sleeve and an inner side of the coil spring so as to exert the torque on the coil spring for decreasing the inner diameter of the coil spring to constrict the sleeve.

22. The support arm of claim 16, wherein the arm mechanism further comprises:
 a second damping member disposed between the second shaft and the second pivot base for increasing a rotating torque of the second shaft relative to the second pivot base.

23. The support arm of claim 22, wherein the second damping member comprises a plurality of friction pads sleeving the second shaft and abutting against the second pivot base.

24. The support arm of claim 16, wherein the first damping member comprises a plurality of friction pads sleeving the first shaft and abutting against the first pivot base.

25. The support arm of claim 16, wherein the support plate further has a plurality of positioning slots in a radial arrangement, and the support arm further comprises:
 a clamping mechanism comprising:
  a U-shaped clamping base having a first arm portion and a second arm portion, a hook structure extending from the first arm portion for clamping the first pivot pillar when the first arm portion is engaged with one of the plurality of positioning slots; and
  a screw rod screwed on the second arm portion and having a clamping plate portion for rotating relative to the second arm portion to make the clamping plate portion clamp the support member cooperatively with the support plate when the hook structure hooks the first pivot pillar.

26. The support arm of claim 25, wherein the hook structure is a C-shaped hook.

27. The support arm of claim 25, wherein the support mechanism further comprises a buffer pad disposed under the support plate.

28. The support arm of claim 25, wherein the wall-mounted plate, the second pivot base, the first pivot base, the support plate, and the U-shaped clamping base have a hole respectively, and the support arm further comprises:
 a trace electrically connected to the display monitor and passing through the holes of the wall-mounted plate and the second pivot base, the arm body, and the holes of the first pivot base and the support plate sequentially to extend through the hole of the U-shaped clamping base.

29. The support arm of claim 16, wherein the support plate is detachably disposed on a support wall or a support rod for hanging the display monitor on the support wall or the support rod after the support plate is detached from the support member.

* * * * *